United States Patent
Takamoto et al.

(10) Patent No.: US 9,545,855 B2
(45) Date of Patent: Jan. 17, 2017

(54) BICYCLE CONTROL APPARATUS

(71) Applicant: Shimano Inc., Sakai, Osaka (JP)

(72) Inventors: Ryuichiro Takamoto, Osaka (JP); Jun Gao, Osaka (JP); Ayumi Kato, Osaka (JP); Makoto Usui, Osaka (JP); Taihei Nishihara, Osaka (JP); Yasuhiro Tsuchizawa, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 14/729,288

(22) Filed: Jun. 3, 2015

(65) Prior Publication Data
US 2015/0367750 A1 Dec. 24, 2015

(30) Foreign Application Priority Data

Jun. 24, 2014 (JP) .................................. 2014-128926

(51) Int. Cl.
*B60L 15/20* (2006.01)
*B62M 6/45* (2010.01)
*B62K 11/00* (2006.01)

(52) U.S. Cl.
CPC .............. *B60L 15/20* (2013.01); *B62K 11/00* (2013.01); *B62M 6/45* (2013.01); *B60W 2510/081* (2013.01); *B60W 2520/28* (2013.01); *Y02T 10/7275* (2013.01)

(58) Field of Classification Search
CPC .......... B60L 15/20; B62K 11/00; B62K 23/00; B62K 23/02; B60W 40/104; B60W 2510/10; B60W 2510/081; B60W 2520/28; B62M 6/40; B62M 6/45
See application file for complete search history.

(56) References Cited

U.S. PATENT DOCUMENTS

| 5,924,511 | A * | 7/1999 | Takata ................ B60L 11/1801 180/206.2 |
| 6,580,188 | B2 * | 6/2003 | Katagiri .............. B60L 11/1801 180/65.26 |
| 2005/0177285 | A1 * | 8/2005 | Honda ..................... B62M 7/12 701/22 |
| 2016/0297499 | A1 * | 10/2016 | Ohashi .................... B62M 6/45 |

FOREIGN PATENT DOCUMENTS

| JP | 3-193877 A | 7/1997 |
| JP | 9-263290 A | 10/1997 |
| JP | 10-167161 A | 6/1998 |
| JP | 11-59557 A | 3/1999 |
| JP | 11-105776 A | 4/1999 |
| JP | 2000-95180 A | 4/2000 |
| JP | 2004-58993 A | 2/2004 |
| JP | 2012-144061 A | 8/2012 |

* cited by examiner

Primary Examiner — Michael J Zanelli
(74) Attorney, Agent, or Firm — Global IP Counselors (57) ABSTRACT

A bicycle control apparatus is configured to control a drive unit having a motor that assist in manual driving. The bicycle control apparatus includes an operating unit and a control unit. The operating unit is configured to be operated in accordance with first and second operating methods that are different from each other. The control unit is configured to change a setting state of a function that is set in advance without driving the drive unit in response to the operating unit being operated in accordance with the first operating method. The control unit is configured to drive the drive unit in response to the operating unit being operated in accordance with the second operating method.

18 Claims, 6 Drawing Sheets

BICYCLE CONTROL APPARATUS

CROSS-REFERENCE TO RELATED APPLICATIONS

This application claims priority to Japanese Patent Application No. 2014-128926, filed on Jun. 24, 2014. The entire disclosure of Japanese Patent Application No. bicycle control apparatus is hereby incorporated herein by reference.

BACKGROUND

Field of the Invention

This invention generally relates to a control apparatus. More specifically, the present invention relates to a bicycle control apparatus that controls a drive unit with a motor for assisting manual pedaling.

Background Information

Regarding a control apparatus that controls a drive unit configured to assist manual driving with a motor, a control apparatus that is configured to drive a motor during pushing-walking is conventionally known (refer to, for example, Japanese Laid-Open Patent Publication No. 1997-263290). In a conventional control apparatus, a motor is driven during the operation of a pushing-walking operating unit, and the motor is stopped when the operation is canceled. Additionally, in a conventional control apparatus, the traveling speed of the bicycle is detected; during pushing-walking, the motor is controlled so that the vehicle speed will be less than or equal to 5 km per hour.

SUMMARY

Generally, the present disclosure is directed to various features of a control apparatus. In a conventional control apparatus, a pushing-walking operating unit dedicated to pushing-walking becomes necessary, so that two operating units become necessary, the pushing-walking operating unit and a normal assisting operating unit that assists the manual drive force when riding.

Additionally, in a conventional control apparatus, the motor is controlled so that the vehicle speed will not exceed 5 km per hour, using the vehicle speed that is detected by a vehicle speed sensor. A vehicle speed sensor that is provided to a bicycle has a magnetic detection unit that detects a magnet that is provided to a wheel. In a vehicle speed sensor configured in this way, for example, the number of pulses per unit of time that is output from the magnetic detection unit will be small when at a speed that is less than or equal to 3 km per hour, so that the vehicle speed cannot be precisely detected. For this reason, in a conventional control apparatus, a motor for pushing-walking cannot be precisely controlled.

An object of the present invention is to be able to drive a motor during pushing-walking with a simple configuration.

Another object of the present invention is to be able to precisely control a motor for pushing-walking even when the vehicle speed of the bicycle is a low speed.

In view of the state of the known technology and in accordance with a first aspect of the present disclosure, a bicycle control apparatus is configured to control a drive unit having a motor that assist in manual driving. The bicycle control apparatus comprises an operating unit and a control unit. The operating unit is configured to be operated in accordance with first and second operating methods that are different from each other. The control unit is configured to change a setting state of a function that is set in advance without driving the drive unit in response to the operating unit being operated in accordance with the first operating method. The control unit is configured to drive the drive unit in response to the operating unit being operated in accordance with the second operating method.

In accordance with a second aspect of the present invention, the bicycle control apparatus according to the first aspect is configured so that the control unit is configured to drive the drive unit while the operating unit is being operated in accordance with the second operating method.

In accordance with a third aspect of the present invention, the bicycle control apparatus according to the first aspect is configured so that the control unit is configured to start driving the drive unit upon the operating unit being operated in accordance with the second operating method.

In accordance with a fourth aspect of the present invention, the bicycle control apparatus according to the third aspect is configured so that the control unit is configured to stop the driving of the drive unit when the operating unit is operated while the drive unit is being driven after the operating unit has been operated by the second operating method.

In accordance with a fifth aspect of the present invention, the bicycle control apparatus according to any one of the first to fourth aspects is configured so that the control unit is configured to determine that the operating unit was operated by the first operating method upon determining the operating unit is operated for less than a prescribed amount of time. The control unit is configured to determine that the operating unit has been operated by the second operating method upon determining the operating unit has been operated for greater than or equal to the prescribed amount of time.

In accordance with a sixth aspect of the present invention, the bicycle control apparatus according to any one of the first to fifth aspects is configured so that the control unit is configured to change a level of the assist force that is provided by the motor according to a manual force when the operating unit is operated by the first operating method.

In accordance with a seventh aspect of the present invention, the bicycle control apparatus according to any one of the first to sixth aspects further comprises a manual drive force detecting unit configured to detect the manual drive force. The control unit being configured to stop the driving of the drive unit upon the manual drive force detecting unit detecting greater than or equal to a prescribed manual drive force while the drive unit is being driven after the operating unit has been operated by the second operating method.

In accordance with an eighth aspect of the present invention, the bicycle control apparatus according to any one of the first to seventh aspects further comprises a crank rotational state detecting unit configured to detect a rotational state of a crank of a bicycle comprising the drive unit. The control unit is configured to stop the driving of the drive unit upon the crank rotational state detecting unit detecting a prescribed rotational state while the drive unit is being driven after the operating unit has been operated by the second operating method.

In accordance with a ninth aspect of the present invention, the bicycle control apparatus according to any one of the first to eighth aspects further comprises a vehicle speed detecting unit configured to detect a vehicle speed of a bicycle comprising the drive unit. The control unit is configured to control the drive unit to be less than or equal to a prescribed vehicle speed based on a detection result of the vehicle speed detecting unit.

In accordance with a tenth aspect of the present invention, a bicycle control apparatus is configured to control a drive unit having a motor that assist in manual driving. The bicycle control apparatus comprises an operating unit, a control unit, a vehicle speed estimation section and a vehicle speed detecting unit. The control unit is configured to drive the drive unit when the operating unit has been operated. The vehicle speed estimation section is configured to estimate a vehicle speed of a bicycle based on a rotational speed of the motor. The vehicle speed detecting unit is configured to calculate the vehicle speed of the bicycle, based on a rotational state of a wheel of the bicycle. The control unit is configured to drive the drive unit based on the speed that has been estimated by the vehicle speed estimation section when the speed of the bicycle is in a first speed range. The control unit is configured to drive the drive unit based on the speed obtained from the vehicle speed detecting unit when the speed of the bicycle is in a second speed range that is higher than the first speed range.

In accordance with an eleventh aspect of the present invention, the bicycle control apparatus according to the tenth aspect further comprises a gear changing state detecting unit that detects a state of a transmission that is provided to the bicycle. The vehicle speed estimation section is configured to estimate the vehicle speed of the bicycle based on the state of the transmission that has been detected by the gear changing state detecting unit, the rotational speed of the motor and information regarding a circumference of the wheel.

In accordance with a twelfth aspect of the present invention, the bicycle control apparatus according to the eleventh aspect is configured so that the gear changing state is a gear ratio or a shift position.

In accordance with a thirteenth aspect of the present invention, the bicycle control apparatus according to any one of the tenth to twelfth aspects is configured so that the control unit is configured to stop the driving of the drive unit when the speed of the bicycle exceeds the second speed range.

In accordance with a fourteenth aspect of the present invention, the bicycle control apparatus according to any one of the tenth to thirteenth aspects is configured so that the speed detecting unit comprises a magnet that is provided to a bicycle wheel.

In accordance with a fifteenth aspect of the present invention, the bicycle control apparatus according to any one of the first to fourteenth aspects is configured so that the control unit limits an output force of the drive unit so that the output force of the motor will not exceed a prescribed force when the operating unit is operated and the drive unit is being driven.

With the above mentioned aspects of the present invention, conducting assist control with a simple configuration is possible.

Also with the above mentioned aspects of the present invention, when the drive unit is driven for pushing-walking, motor control can be precisely conducted even when the vehicle speed of the bicycle is a low speed.

Also other objects, features, aspects and advantages of the disclosed bicycle control apparatus will become apparent to those skilled in the art from the following detailed description, which, taken in conjunction with the annexed drawings, discloses preferred embodiments of the bicycle control apparatus.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
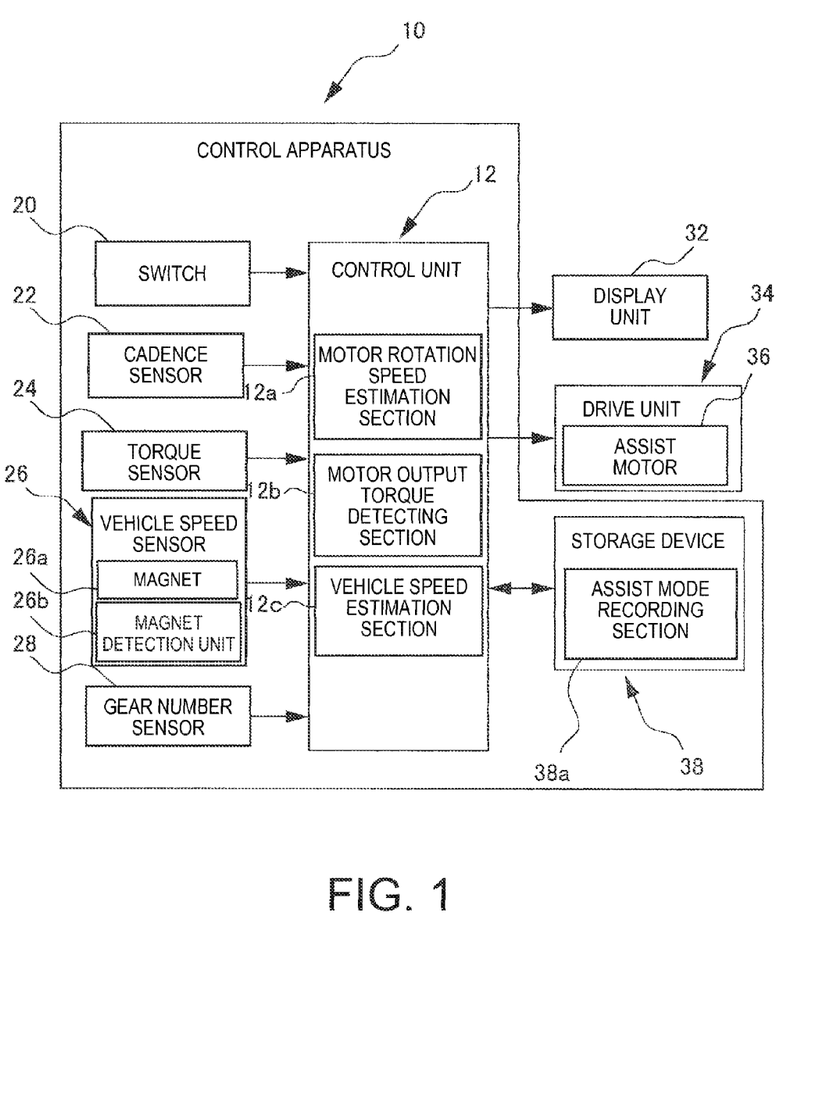
FIG. 1 is a block diagram showing a configuration of a bicycle control apparatus in accordance with a first embodiment.

As shown in FIG. 1, a bicycle control apparatus 10 (hereinafter, referred to simply as the control apparatus 10) is illustrated in accordance with a first embodiment. The control apparatus 10 controls a drive unit 34 configured to assist manual driving with an assist motor 36. The control apparatus 10 comprises a control unit 12, a switch 20, a cadence sensor 22, a force sensor 24, a vehicle speed sensor 26, a gear number sensor 28 and a storage device 38. The switch 20, the cadence sensor 22, the force sensor 24, the vehicle speed sensor 26, the gear number sensor 28, and the storage device 38 are electrically connected to the control unit 12. The control unit 12 is one example of a controller that preferably includes one or more processors with one or more control programs that controls various aspects of the control apparatus 10 as discussed below. The switch 20 is one example of an operating unit or operating device. The cadence sensor 22 is one example of a crank rotational state-detecting unit that detects the rotational state of a crank of a bicycle comprising the drive unit 34. The force sensor 24 is one example of a manual drive force-detecting unit configured to detect the manual drive force. The vehicle speed sensor 26 is one example of a vehicle speed-detecting unit. The gear number sensor 28 is one example of a gear changing state detecting unit. The control apparatus 10, the assist motor 36, and a display unit 32 are connected to a battery that is not diagrammed.

In the first embodiment, the switch 20 is, for example, a push-button switch; for example, this switch turns ON when pressed. The cadence sensor 22 detects the rotational speed of a crankshaft of the bicycle, which is not diagrammed. The force sensor 24 detects the force T that acts on the crank as the manual drive force. The vehicle speed sensor 26 detects the vehicle speed SV of the bicycle. The vehicle speed sensor 26 comprises at least one magnet 26a that is provided on a wheel of the bicycle and a magnetic detection unit 26b that detects this magnet 26a. The gear number sensor 28 detects the gear changing state of the transmission that is provided on the bicycle. In the case that the transmission is an internal transmission, the gear number sensor 28 detects the shift position of the gear ratio. In the case that the transmission is an external transmission, the gear number sensor 28 detects the shift position of both the front derailleur and the rear derailleur or the gear ratio in the shift position of the front derailleur and the rear derailleur. The storage device 38 stores various types of data. The storage device 38 is configured by, for example, a nonvolatile memory. The storage device 38 comprises a switch state recording section 38a for recording the state of the switch 20 every time the switch 20 is operated.

The display unit 32 and the drive unit 34 are connected to the control unit 12 as objects to be controlled. The display unit 32 can be realized by, for example, a cycle computer. The display unit 32 is, for example, a liquid crystal display configured to display information such as the vehicle speed, the assist level, the type of assist mode (the pushing-walking assist mode and the normal assist mode, mentioned below), and the gear number of the transmission. The drive unit 34 comprises an assist motor 36 and assists the manual driving with the assist motor 36. The assist motor 36 is an electric motor. The drive unit 34 is configured to operate in at least two types of assist modes, a normal assist mode in which the assist motor 36 is driven according to the manual drive force that acts on the crank and a pushing-walking assist mode in which the traveling of the bicycle is assisted during pushing-walking. The assist level is, for example, provided in a plurality of steps. For example, in the case that four steps of assist levels are provided, the steps comprise a strong assist level, a medium assist level, a weak assist level, and a zero assist level. In the zero assist level, the motor unit 34 is not driven, and assisting is not conducted.

The control unit 12 is configured as a microcomputer comprising, for example, a CPU (Central Processing Unit) that includes one or more processors, a memory or storage device such as a ROM (Read Only Memory) device and a RAM (Random Access Memory) device, an I/O interface and a timer. The memory stores processing results and control programs such as ones for the control operation that are run by the one or more processors. The control unit 12 comprises a motor rotational speed estimation section 12a, a motor output force detecting section 12b and a vehicle speed estimation section 12c. These sections 12a, 12b and 12c are configured as functional components realized by software. The motor rotational speed estimation section 12a is programmed to estimate the rotational speed MS of the assist motor 36, based on a motor rotational speed command that the control unit 12 outputs to the drive unit 34. The motor output force detecting section 12b is programmed to detect the output force MT of the assist motor 36 from the value of the electric current that flows in the assist motor 36. The vehicle speed estimation section 12c is programmed to estimate the vehicle speed MV of the bicycle based on the gear ratio that is detected by the gear number sensor 28, the rotational speed MS of the assist motor 36, the gear ratio of the transmission that is obtained from the gear number sensor 28, and information regarding the circumference of the wheel. Meanwhile, in the case that a decelerating mechanism, such as a planetary gear mechanism, is included in the drive unit 34, the rotational speed MS of the assist motor 36 is also estimated with consideration for the reduction gear ratio of the decelerating mechanism.

When the rider operates the switch 20 by the first operating method, the control unit 12 changes the setting state of a function that is set in advance without driving the drive unit 34. The first operating method is, for example, pressing the switch 20 for less than n seconds. In the first embodiment, for example, "n" seconds is greater than or equal to 2 seconds. If the rider operates the switch 20 by the first operating method, the control unit 12 changes the level of the assist force that is provided by the assist motor 36 according to the manual drive force. Changing the level of the assist force that is provided by the assist motor 36 is one example of changing the setting state of a function that has been set in advance. Additionally, if the rider operates the switch 20 by the second operating method, the control unit 12 drives the drive unit 34. The second operating method is, for example, pressing the switch 20 for more than or equal to n seconds.

In the first embodiment, when the switch 20 is operated by the first operating method, the control unit 12, for example, changes the level of the assist force that is provided by the assist motor 36 according to the manual drive force in the normal assist mode. Additionally, when the switch 20 is operated by the second operating method, the control unit 12 drives the drive unit 34 in the pushing-walking assist mode while the switch 20 is being operated. Also, when the switch 20 is being operated by the second operating method and the drive unit 34 is being driven, the control unit 12 will stop the driving of the drive unit 34 in the pushing-walking assist mode when the operation of the switch 20 has ended.

Next, one example of a specific control operation of the first embodiment of the control unit 12 will be explained based on the flowcharts shown in FIG. 2 to FIG. 4. Meanwhile, the procedure of the first embodiment is not limited to that explained in FIG. 2 to FIG. 4.

Figure 2:
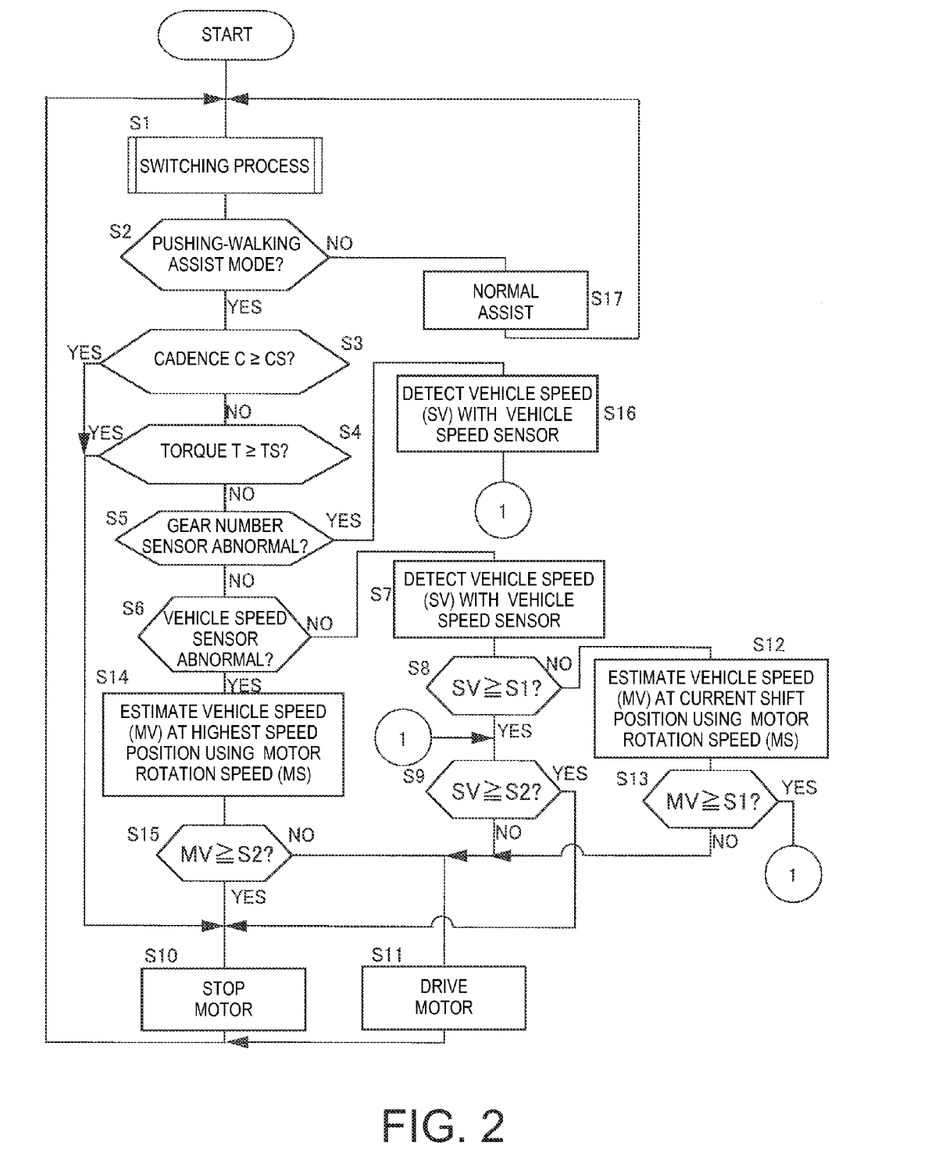
FIG. 2 is a flow chart showing one example of a control process executed by the control unit.
Figure 3:
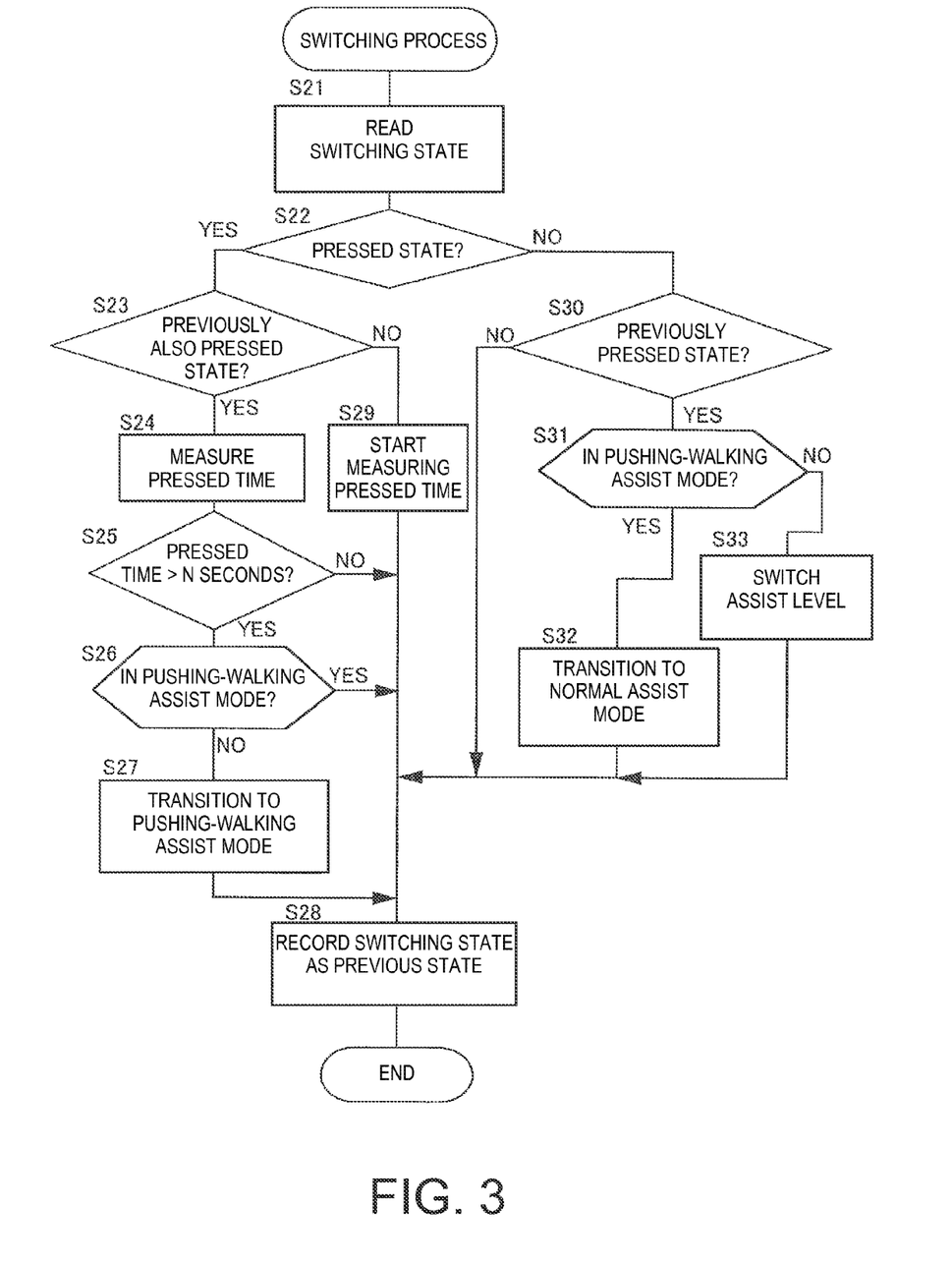
FIG. 3 is a flow chart showing one example of a control process of the switching operation according to the first embodiment of the control unit.

In FIG. 2, when power is supplied to the control apparatus 10, the control unit 12 will execute the switching operation shown in FIG. 3 in step S1. In the switching operation, the state of the switch 20 is stored in a switching state recording section 38a of the storage device 38 every time the switch 20 is operated. The details of the switching operation will be explained below.

In step S2 in FIG. 2, the control unit 12 determines whether or not the pushing-walking assist mode has been set by the switching operation. When a determination has been made that the pushing-walking assist mode has been set, the control unit 12 advances the operation from step S2 to step S3. In step S3, the control unit 12 takes in the output from the cadence sensor 22 and determines whether or not the cadence C is in a prescribed rotational state. A prescribed rotational state is, for example, a state in which the crank is rotating equal to or faster than a prescribed rotational speed CS and a state in which a determination can be made that the rider is sitting on the saddle and rotating the crank. A prescribed rotational speed CS is, for example, selected from 1-5 rpm. If the determination is that the cadence C is not in the prescribed rotational state, the control unit 12 advances the operation from step S3 to step S4. In step S4, the control unit 12 takes in an output from the force sensor 24 and determines whether or not the force (the manual drive force) T that acts on the crankshaft is greater than or equal to a prescribed force TS. A prescribed force TS is a force with which a determination can be made that a rider is sitting on the saddle and rotating the crank. The prescribed TS is, for example, a value selected from a range of 0.1-0.2 Nm. When the determination is that the force T is not greater than or equal to the prescribed force TS, the control unit 12 advances the operation from step S4 to step S5.

In step S5, the control unit 12 determines whether or not an abnormality has occurred in the gear number sensor 28. If an abnormality has occurred in the gear number sensor 28, the vehicle speed of the bicycle cannot be precisely estimated based on the motor rotational speed MS during a low speed. When the determination is that an abnormality has not occurred in the gear number sensor 28, the control unit 12 advances the operation from step S5 to step S6. In step S6, the control unit 12 determines whether or not an abnormality has occurred in the vehicle speed sensor 26. If a determination is made that an abnormality has not occurred in the vehicle speed sensor 26, the control unit 12 advances the operation from step S6 to step S7. In step S7, the detected value from the vehicle speed sensor 26 is read as the vehicle speed SV. In step S8, the control unit 12 determines whether or not the vehicle speed SV that has been detected by the vehicle speed sensor 26 is greater than or equal to a first speed S1. The first speed S1 is, for example, 3 km per hour. A first speed range is greater than or equal to 0 km per hour and is less than the first speed S1. If the determination is that the vehicle speed SV that has been detected by the vehicle speed sensor 26 is greater than or equal to the first speed S1, since the vehicle speed sensor 26 can detect an accurate vehicle speed, the control unit 12 advances the operation from step S8 to step S9. In step S9, the control unit 12 determines whether or not the vehicle speed SV that has been detected by the vehicle speed sensor 26 is greater than or equal to a second speed S2. The second speed S2 is the maximum speed during the pushing-walking assist mode and is, for example, 5 km per hour. A second speed range is greater than or equal to the first speed S1 and is less than the second speed S2. When the determination is made that the vehicle speed SV that has been detected by the vehicle speed sensor 26 is greater than or equal to the second speed S2, since this is a speed that is too fast for the pushing-walking assist mode, the control unit 12 advances the operation from step S9 to step S10 and stops the assist motor 36. Meanwhile, if the determination is that the vehicle speed SV that has been detected by the vehicle speed sensor 26 is less than the second speed S2, the control unit advances the operation from step S9 to step S11, drives the assist motor 36, and advances the operation to step S1. Specifically, when the assist motor 36 is not being driven, driving is started; when the assist motor is being driven, driving will be continued.

In step S8, when the control unit 12 determines that the vehicle speed SV that has been detected by the vehicle speed sensor 26 is less than the first speed S1, since an accurate vehicle speed cannot be detected by the vehicle speed sensor 26, the control unit 12 advances the operation from step S8 to step S12. In step S12, the control unit 12 estimates the vehicle speed MV of the bicycle from the motor rotational speed MS that has been estimated by the motor rotational speed estimation section 12a, the current shift position or gear ratio of the transmission, and the circumference of the wheel. In step S13, the control unit 12 determines whether or not the estimated vehicle speed MV is greater than or equal to the first speed S1. If the determination is that the estimated vehicle speed MV is less than the first speed S1, the control unit 12 advances the operation from step S13 to step S11 and drives the assist motor 36. If the determination is that the estimated vehicle speed MV is greater than or equal to the first speed S1, the control unit 12 advances the operation from step S13 to step S9.

In step S5, when the determination is that an abnormality has occurred in the gear number sensor 28, the control unit 12 advances the operation from step S5 to step S16. In step S16, the control unit 12 carries out the same operation as in step S7 mentioned above and reads the detected value from the vehicle speed sensor 26 as the vehicle speed SV. Then, the control unit 12 advances the operation from step S16 to step S9.

In step S6, when the determination is that an abnormality has occurred in the vehicle speed sensor 26, the control unit 12 advances the operation from step S6 to step S14. In step S14, the control unit 12 estimates the vehicle speed MV of the bicycle from the motor rotational speed MS that has been estimated by the motor rotational speed estimation section 12a, the shift position of the highest speed or the highest gear ratio of the transmission, and the circumference of the wheel. This is because the vehicle speed sensor 26 will not operate normally, but the estimated vehicle speed will not exceed the actual vehicle speed even if the actual shift position or the gear ratio is not known, with the control unit 12 estimating the vehicle speed MV not from the current gear ratio but from the highest gear ratio. In step S15, the control unit 12 determines whether or not the estimated vehicle speed MV is greater than or equal to the second speed S2. When the determination is that the estimated vehicle speed MV is greater than or equal to the second speed S2, since this is a speed that is too fast for the pushing-walking assist mode, the control unit 12 advances the operation from step S15 to step S10 and stops the assist motor 36. If the determination is that the estimated vehicle speed MV is less than the second speed S2, the control unit 12 advances the operation from step S15 to step S11 and drives the assist motor 36.

When the determination is that the current mode is not the pushing-walking assist mode in step S2, the control unit 12 advances the operation from step S2 to step S17. In step S17, the control unit 12 executes the normal assist operation and advances the operation to step S1. In the normal assist operation, the control unit 12 drives the assist motor 36 at an assist level that has been selected by the switch 20 according to the force T that is detected by the force sensor 24.

In the switching operation in FIG. 3, the control unit 12 reads the current switching state of the switch 20 in step S21. In step S22, the control unit 12 determines whether or not the current switching state is a pressed state. If the determination is that the current switching state of the switch 20 is in the pressed state, the control unit 12 advances the operation from step S22 to step S23. In step S23, the control unit 12 reads the previous switching state from the switching state recording section 38a of the storage device 38 and determines whether or not the switching state that was previously recorded was the pressed state. If the determination is that the switch was previously also in the pressed state, the control unit 12 advances the operation from step S23 to step S24. In step S24, the control unit 12 measures the time that the switch 20 has been pressed and advances the operation to step S25. In step S25, the control unit 12 determines whether or not the pressed time exceeded n seconds, i.e., whether or not the rider operated the switch 20 by the second operating method. When the determination is that the pressed time has exceeded n seconds and that the rider has operated the switch 20 by the second operating method, the control unit 12 advances the operation from step S25 to step S26. In step S26, the control unit 12 determines whether or not the current mode is the pushing-walking assist mode. Meanwhile, in the following explanation, the determination of whether or not the current mode is the pushing-walking assist mode is not simply determining whether or not the assist mode has been set to the pushing-walking assist mode; rather, the determination is whether or not the assist motor 36 is being driven in the pushing-walking assist mode. That is, in the case that the determination is that the current mode is the pushing-walking assist mode, the assist motor 36 is being driven in the pushing-walking assist mode. When the determination is that the current mode is not the pushing-walking assist mode, the control unit 12 advances the operation from step S26 to step S27. In step S27, the control unit 12 transitions from the normal assist mode to the pushing-walking assist mode, displays that the mode is the pushing-walking assist mode in the display unit 32, and advances the operation to step S28. In step S28, the control unit 12 records the switching state at this time as the previous switching state in the switching state recording section 38a of the storage device 38, ends the switching operation, and advances the operation to step S2 in FIG. 2.

In step S23, when the determination is that the switch 20 is in the pressed state for the first time, the control unit 12 advances the operation from step S23 to step S29. In step S29, the control unit 12 starts a timer that this unit has, measures the pressed time of the switch 20, and advances the operation to step S28. In step S25, if the determination is that the pressed time is less than or equal to n seconds, the control unit 12 advances the operation to step S28. In step S26, if the determination is that the current mode is the pushing-walking assist mode, the control unit 12 advances the operation to step S28.

In step S22, when the determination is that the switch 20 is not in the pressed state for the first time, the control unit 12 advances the operation from step S22 to step S30. In step S30, the control unit 12 reads the previous switching state from the switching state recording section 38a of the storage device 38 and determines whether or not this was previously in the pressed state. If the determination is that the switch was previously in the pressed state, this means that the switch took on a non-pressed state from the pressed state for the first time; therefore, the operation advances from step S30 to step S31. In step S31, the control unit 12 determines whether or not the current mode is in the pushing-walking assist mode. When the determination is that the current mode is the pushing-walking assist mode, the control unit 12 advances the operation from step S31 to step S32. In step S32, the control unit 12 transitions the assist mode from the pushing-walking assist mode to the normal assist mode, displays that the mode is in the normal assist mode in the display unit 32, and advances the operation from step S32 to step S28. In step S30, when the determination is that the switch was not previously in the pressed state, since the switch 20 has not been operated at all, the control unit 12 advances the operation from step S30 to step S28. When the determination is that the mode is not the pushing-walking mode in step S31, the control unit 12 determines that the rider has operated the switch by the first operating method and advances the operation from step S31 to step S33. In step S33, the control unit 12 changes the assist level of the normal assist mode, that is, the level of the assist force that is provided by the assist motor 36 according to the manual force, displays the changed assist level in the display unit 32, and advances the operation from step S33 to step S28.

Figure 4:
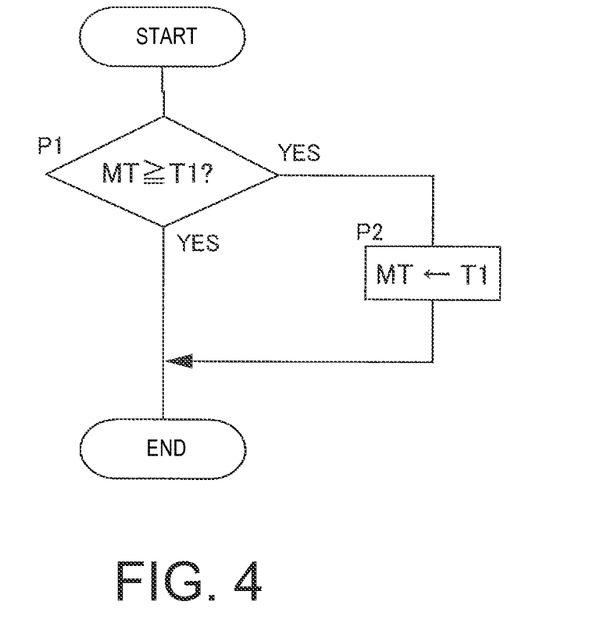
FIG. 4 is a flow chart showing an operation of limiting the motor output force.

Additionally, during the pushing-walking assist mode, the control unit 12 also carries out a control to limit the output force MT of the assist motor 36 of the drive unit 34, as shown in FIG. 4. In FIG. 4, when the driving of an assist motor 42 is started in the pushing-walking assist mode, the control unit 12 executes the step of step P1 in FIG. 4. In step P1, the control unit 12 takes in information regarding the output force MT of the assist motor 36 from the motor output force detecting section 12b and determines whether or not the output force MT is greater than or equal to a prescribed force T1. The force T1 is, for example, a force with which maintaining a target vehicle speed and climbing a slope with a prescribed gradient are possible. The target vehicle speed is set, for example, to be 4 km per hour, and the prescribed gradient is set, for example, to be 5%. The force T1 can be set, for example, at the time of factory shipment, or this force can be set by an input unit configured to connect to the control apparatus 10. When the determination is that the output force MT that has been taken in is greater than or equal to the force T1, the control unit 12 advances the operation from step P1 to step S2. In step S2, the output force MT is clamped to the prescribed force T1, and the output force MT of the drive unit 34 is limited so that the output force MT will not exceed the force T1. With this, for example, even when speed control is applied to the pushing-walking assist mode, the output force MT of the assist motor 36 will be limited. For this reason, when climbing a steep slope in the pushing-walking assist mode, the speed of the bicycle can be reduced when compared to being on level ground.

Here, by operating one switch 20 with the first operating method and the second operating method, which is different from the first operating method, an operation to change the setting state of a function without driving the drive unit 34 and an operation to drive the drive unit 34 can be conducted. For this reason, the assist control can be carried out with a simple configuration. Additionally, since the pushing-walking assist will function only when the switch 20 has been operated, the driving of the motor in the pushing-walking assist mode can be immediately stopped.

Second Embodiment

Figure 5:
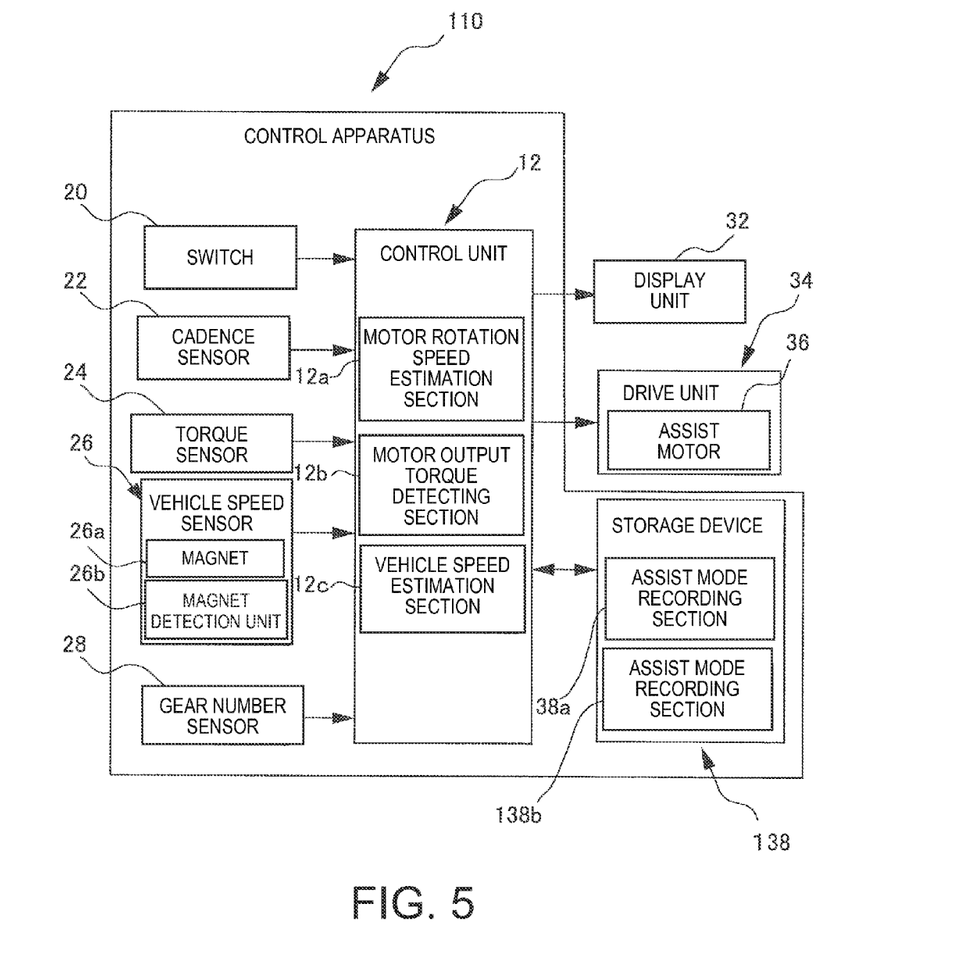
FIG. 5 is a block diagram showing a configuration of the bicycle control apparatus according to a second embodiment.

In the second embodiment, the configuration is such that, when the switch 20 is operated and the assist motor is driven in the pushing-walking assist mode, the driving of the assist motor will continue even if the operation of the switch 20 has been stopped, and the pushing-walking assist is released when the switch 20 is operated again.

In FIG. 5, in the second embodiment, the storage device 138 comprises, in addition to the switching state recording section 38a, an assist mode recording section 138b that records which assist mode is being used, the pushing-walking assist mode or the normal assist mode. The other configurations of the control apparatus 110 are the same as those described in the first embodiment; therefore, these configurations have been disclosed in FIG. 5 with the same reference symbols, and their explanations have been omitted. Additionally, the entire procedure of the control unit 12 is the same as the procedure of the first embodiment, as shown in FIG. 2, and only the switching operation is different from the first embodiment. Therefore, only the switching operation will be explained using FIG. 6, and the other explanations have been omitted. Meanwhile, the procedure of the second embodiment is not limited to the explanation in FIG. 6.

Figure 6:
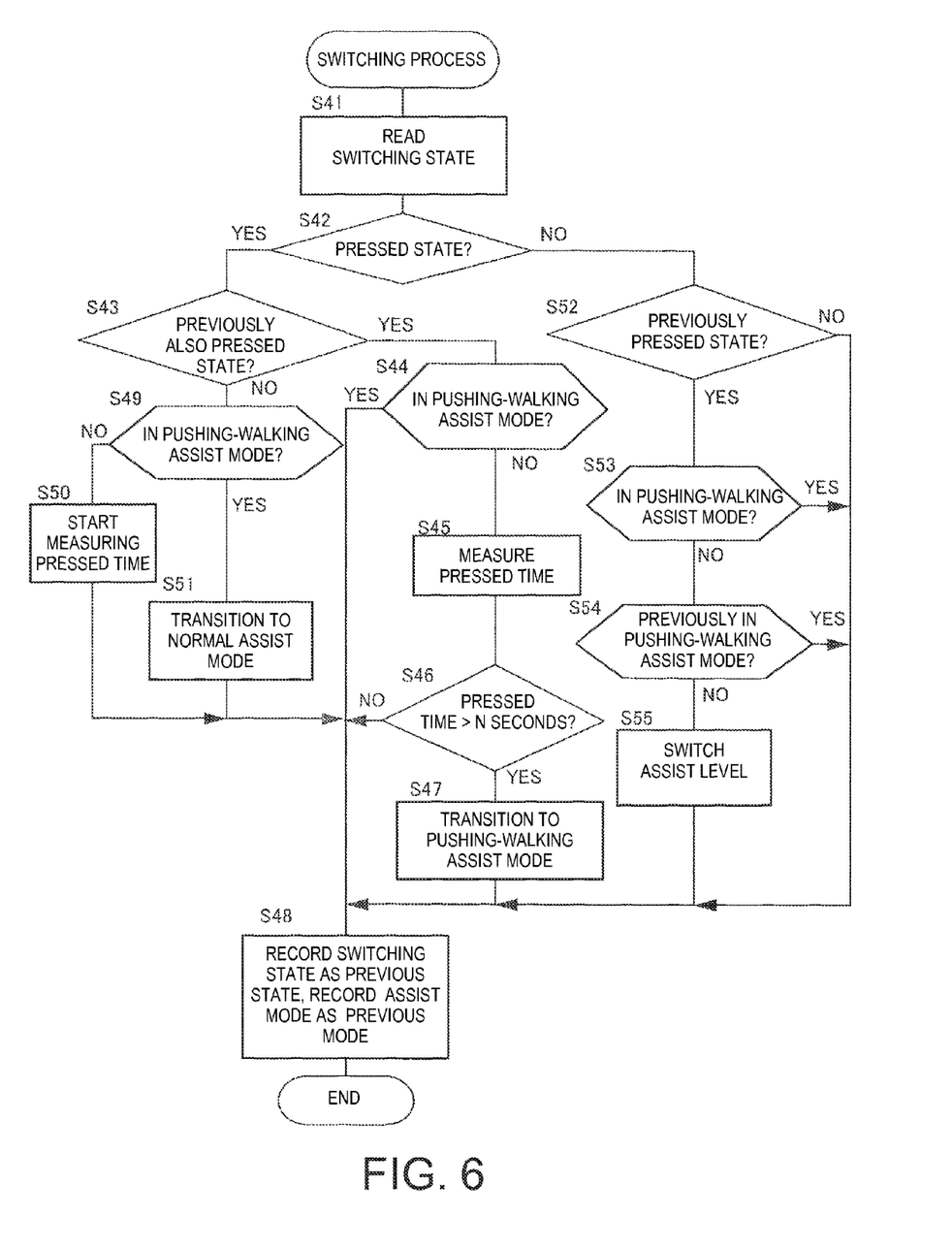
FIG. 6 is a flow chart showing one example of a control process of the switching operation according to the second embodiment.

In the switching operation of the second embodiment, the control unit 12 reads the current switching state of the switch 20 in step S41 in FIG. 6. In step S42, the control unit 12 determines whether or not the current switching state is a pressed state. If the determination is that the current switching state of the switch 20 is in the pressed state, the control unit 12 advances the operation from step S42 to step S43. In step S43, the control unit 12 reads the previous switching state from the switching state recording section 38a of the storage device 38 and determines whether or not the switch was previously also in the pressed state. If the determination is that the switch was previously also in the pressed state, the control unit 12 advances the operation from step S43 to step S44. In step S44, the control unit 12 determines whether or not the current mode is the pushing-walking assist mode. When the determination is that the current mode is not the pushing-walking assist mode, the control unit 12 advances the operation from step S44 to step S45. In step S45, the time during which the switch 20 was pressed is measured, and the operation advances to step S46. In step S46, the control unit 12 determines whether or not the pressed time exceeded n seconds, i.e., whether or not the rider operated the switch 20 by the second operating method. When the determination is that the pressed time has exceeded n seconds and that the rider has operated the switch 20 by the second operating method, the control unit 12 advances the operation from step S46 to step S47. In step S47, the control unit 12 transitions the assist mode from the normal assist mode to the pushing-walking assist mode, displays that the mode is in the pushing-walking assist mode in the display unit 32, and advances the operation to step S48.

In step S48, the control unit 12 records the switching state at this time as the previous switching state in the switching state recording section 38a of the storage device 138. The control unit 12 also records the assist mode at this time as the previous assist mode in the assist mode recording section 138b, ends the switching operation, and advances the operation to step S2 in FIG. 2.

In step S43, when the determination is that the switch 20 was previously not in the pressed state, in other words, when the determination is that the switch 20 was in the pressed state for the first time, the control unit 12 advances the operation to step S49. In step S49, the control unit 12 determines whether or not the current mode is the pushing-walking assist mode. When the determination is that the current mode is not the pushing-walking mode in step S49, the control unit 12 advances the operation to step S50. In step S50, the control unit 12 starts a timer that the unit has, measures the pressed time of the switch 20, and advances the operation to step S48. When the determination is that the current mode is the pushing-walking mode in step S49, the control unit 12 advances the operation to step S51. In the second embodiment, the switch 20 is operated during the pushing-walking mode in order to cancel the pushing-walking assist mode, that is, to stop the driving of the motor 36 during pushing-walking. For this reason, in step S51, the control unit 12 transitions the assist mode from the pushing-walking assist mode to the normal assist mode, displays that the mode is in the normal assist mode in the display unit 32, and advances the operation to step S48. In this case, in step S48, the switching state is recorded as the pressed state, and the assist mode is recorded as the normal assist mode.

In step S42, when the determination is that the switch 20 is not in the pressed state, the control unit 12 advances the operation from step S42 to step S52. In step S52, the control unit 12 reads the previous switching state from the switching state recording section 38a of the storage device 38 and determines whether or not the switch was previously in the pressed state. If the determination is that the switch was previously in the pressed state, this means that the switch took on a non-pressed state from the pressed state for the first time. For this reason, the control unit 12 advances the operation from step S52 to step S53 in order to determine whether or not the assist motor 36 is being driven. In step S53, the control unit 12 determines whether or not the current mode is the pushing-walking assist mode and the assist motor 36 is being driven. When the determination is that the current mode is the pushing-walking mode and that the assist motor 36 is being driven in step S53, the control unit 12 advances the operation to step S48. In step S48, the control unit 12 records that the switching state of the switch 20 is not in the pressed state as the previous switching state with the switching state recording section 38a. Additionally, the control unit records that the assist mode is in the pushing-walking assist mode as the previous assist mode with the assist mode recording section 138b.

When the determination is that the current mode is not the pushing-walking assist mode, the control unit 12 advances the operation from step S53 to step S54. In step S54, the control unit 12 reads the previous assist mode from the assist mode recording section 138b of the storage device 38 and determines whether or not the assist mode that was previously recorded was in the pushing-walking mode. In step S54, if the determination is that the mode was previously not in the pushing-walking mode, the control unit 12 determines that this is already in the normal assist mode and advances the operation to step S55. In step S55, the assist level in the normal assist mode is switched according to the operation of the switch 20.

In step S54, if the determination is that the mode was previously also in the pushing-walking assist mode, the control unit 12 advances the operation to step S48 and records the current switching state and assist mode with the storage device 138.

In the second embodiment, since the switch 20 does not have to be continuously operated while the motor 36 is driven in the pushing-walking assist mode; therefore, pushing-walking the bicycle becomes easier. Meanwhile, in the second embodiment, the output force MT of the drive unit 34 is also limited so that the output force MT of the assist motor 36 shown in FIG. 4 will not exceed the force T1.

Other Embodiments

One embodiment of the present invention was described above, but the present invention is not limited to the above-described embodiment; various modifications can be made without departing from the scope of the invention. In particular, the various embodiments and modified examples described in the present Specification can be freely combined according to necessity.

(a) In the first and the second embodiments, an example of a long press operation of one switch 20 was described as the second operating method, but the present invention is not limited to this. For example, a case in which one switch is double-click operated (for example, operated twice within one second) can be made to be the second operating method. Additionally, for example, two switches can be provided, and a case in which two switches are operated can be made to be the second operating method. Also, a case in which two switches are operated within a prescribed period of time can be made to be the second operating method. The prescribed time is preferably selected from 0.5 seconds to 1 second.

(b) In the first and the second embodiments, a push button switch was described as an example of the switch 20, but this switch is not limited to a push button switch. The switch can be a switch with another form, such as a slide switch or a switch that is operated by pulling, etc.

(c) In the above-described embodiment, the rotational speed of the assist motor 36 was detected based on the rotation command value, but the rotation of the assist motor can be detected by a sensor.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section,"

"portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle control apparatus configured to control a drive unit having a motor that assist in manual driving, the bicycle control apparatus comprising:
   an operating unit that is a single member configured to be operated in accordance with first and second operating methods that are different from each other; and
   a control unit configured to change a setting state of a function that is set in advance without driving the drive unit in response to the operating unit being operated using the first operating method, and configured to drive the drive unit in response to the operating unit being operated using with the second operating method.

2. The bicycle control apparatus as recited in claim 1, wherein
   the control unit is configured to drive the drive unit while the operating unit is being operated using the second operating method.

3. The bicycle control apparatus as recited in claim 1, wherein
   the control unit is configured to start driving the drive unit upon the operating unit being operated using the second operating method.

4. The bicycle control apparatus as recited in claim 3, wherein
   the control unit is configured to stop the driving of the drive unit when the operating unit is operated while the drive unit is being driven after the operating unit has been operated using the second operating method.

5. The bicycle control apparatus as recited in claim 1, wherein
   the control unit is configured to change a level of the assist force that is provided by the motor according to a manual force when the operating unit is operated using the first operating method.

6. The bicycle control apparatus as recited in of claim 1, further comprising
   a manual drive force detecting unit configured to detect the manual drive force,
   the control unit being configured to stop the driving of the drive unit upon the manual drive force detecting unit detecting greater than or equal to a prescribed manual drive force while the drive unit is being driven after the operating unit has been operated by the second operating method.

7. The bicycle control apparatus as recited in claim 1, further comprising
   a crank rotational state detecting unit configured to detect a rotational state of a crank of a bicycle comprising the drive unit,
   the control unit being configured to stop the driving of the drive unit upon the crank rotational state detecting unit detecting a prescribed rotational state while the drive unit is being driven after the operating unit has been operated by the second operating method.

8. The bicycle control apparatus as recited in claim 1, further comprising
   a vehicle speed detecting unit configured to detect a vehicle speed of a bicycle comprising the drive unit,
   the control unit being configured to control the drive unit to be less than or equal to a prescribed vehicle speed based on a detection result of the vehicle speed detecting unit.

9. The bicycle control apparatus as recited in claim 1, wherein
   the control unit limits an output force of the drive unit so that the output force of the motor will not exceed a prescribed force when the operating unit is operated and the drive unit is being driven.

10. The bicycle control apparatus as recited in claim 1, wherein
    at least one of the first and second operating methods is a long press operation of the operating unit.

11. The bicycle control apparatus as recited in claim 1, wherein
    at least one of the first and second operating methods is a double-click operation of the operating unit.

12. The bicycle control apparatus as recited in claim 1, wherein the operating unit is one of a push button, a slide switch and a pull switch.

13. A bicycle control apparatus configured to control a drive unit having a motor that assist in manual driving, the bicycle control apparatus comprising:
an operating unit configured to be operated in accordance with first and second operating methods that are different from each other; and
a control unit configured to change a setting state of a function that is set in advance without driving the drive unit in response to the operating unit being operated in accordance with the first operating method, and configured to drive the drive unit in response to the operating unit being operated in accordance with the second operating method, the control unit being configured to determine that the operating unit was operated by the first operating method upon determining the operating unit is operated for less than a prescribed amount of time, and
the control unit being configured to determine that the operating unit has been operated by the second operating method upon determining the operating unit has been operated for greater than or equal to the prescribed amount of time.

14. A bicycle control apparatus controls a drive unit configured to assist manual driving with a motor, comprising:
an operating unit;
a control unit configured to drive the drive unit when the operating unit has been operated;
a vehicle speed estimation section configured to estimate a vehicle speed of a bicycle based on a rotational speed of the motor; and
a vehicle speed detecting unit configured to calculate the vehicle speed of the bicycle, based on a rotational state of a wheel of the bicycle,
the control unit configured to drive the drive unit based on the speed that has been estimated by the vehicle speed estimation section when the speed of the bicycle is in a first speed range, and the control unit configured to drive the drive unit based on the speed obtained from the vehicle speed detecting unit when the speed of the bicycle is in a second speed range that is higher than the first speed range.

15. The bicycle control apparatus as recited in claim 14, further comprising
a gear changing state detecting unit that detects a state of a transmission that is provided to the bicycle,
the vehicle speed estimation section being configured to estimate the vehicle speed of the bicycle based on the state of the transmission that has been detected by the gear changing state detecting unit, the rotational speed of the motor and information regarding a circumference of the wheel.

16. The bicycle control apparatus as recited in claim 15, wherein
the gear changing state is a gear ratio or a shift position.

17. The bicycle control apparatus as recited in claim 14, wherein
the control unit is configured to stop the driving of the drive unit when the speed of the bicycle exceeds the second speed range.

18. The bicycle control apparatus as recited in claim 14, wherein
the speed detecting unit comprises a magnet that is provided to a bicycle wheel.

* * * * *